United States Patent [19]

Forneris

[11] Patent Number: 4,705,089
[45] Date of Patent: * Nov. 10, 1987

[54] WHEEL WITH LOCKING SLEEVE
[75] Inventor: Alexandre Forneris, Paris, France
[73] Assignee: Hutchinson S.A., Paris, France
[ * ] Notice: The portion of the term of this patent subsequent to Dec. 17, 2002 has been disclaimed.
[21] Appl. No.: 770,241
[22] Filed: Aug. 28, 1985

Related U.S. Application Data

[63] Continuation of Ser. No. 457,225, Jan. 11, 1983, Pat. No. 4,558,728.

[30] Foreign Application Priority Data

Jan. 15, 1982 [FR] France ............... 82 00607

[51] Int. Cl.$^4$ ............................................. B60C 15/02
[52] U.S. Cl. .................................................... 152/400
[58] Field of Search ............... 152/400, 401, 516, 520

[56] References Cited

U.S. PATENT DOCUMENTS

| 910,441 | 1/1909 | Woodward | 152/401 |
|---|---|---|---|
| 987,344 | 3/1911 | Clarke | 152/400 |
| 1,505,910 | 8/1924 | Michelin | 152/400 |
| 2,339,542 | 1/1944 | Hale | 152/401 |
| 2,857,951 | 10/1958 | Roudebush . | |
| 3,392,772 | 7/1968 | Powers . | |
| 3,857,427 | 12/1974 | Soucek | 152/400 X |
| 3,935,892 | 2/1976 | Arimura et al. . | |
| 4,059,138 | 11/1977 | Mirtain et al. | 152/399 X |
| 4,091,854 | 5/1978 | French et al. . | |
| 4,177,849 | 12/1979 | Osada et al. . | |
| 4,295,509 | 12/1985 | Stein | 152/400 X |
| 4,371,024 | 2/1983 | Stein et al. . | |
| 4,431,043 | 2/1984 | Goodell et al. | 152/401 X |

FOREIGN PATENT DOCUMENTS

| 84490 | 7/1983 | European Pat. Off. . |
|---|---|---|
| 412093 | 4/1925 | Fed. Rep. of Germany . |
| 2429720 | 1/1975 | Fed. Rep. of Germany . |
| 1026545 | 4/1953 | France . |
| 1304992 | 8/1962 | France . |
| 1382994 | 12/1964 | France . |
| 1439429 | 4/1966 | France . |
| 2246405 | 10/1973 | France . |
| 219641 | 10/1924 | United Kingdom . |
| 389964 | 12/1973 | U.S.S.R. . |

OTHER PUBLICATIONS

Article entitled "Rubber Technology and Manufacture" Newnes-Butterworths, pp. 44,46, Blow, C. M.

Primary Examiner—David A. Scherbel
Attorney, Agent, or Firm—Oblon, Fisher, Spivak, McClelland, & Maier

[57] ABSTRACT

A tire mounting device utilizing a locking sleeve wherein the sleeve has an inner diameter substantially equal to the outer diameter of the bottom of the rim so as to encircle the rim and a width slightly greater than the internal separation of the tire beads when the latter are applied to the flanges of the rim, the sleeve being provided with a cross channel to permit the passage of an air passage.

16 Claims, 2 Drawing Figures

WHEEL WITH LOCKING SLEEVE

This is a continuation of Ser. No. 457,225, filed 1-11-83, now U.S. Pat. No. 4,558,728.

BACKGROUND OF THE INVENTION

1. Field of the Invention

The present invention relates to a device for mounting a tire utilizing a locking sleeve and, more particularly, a device for mounting a multiple-use tire, i.e. a tire which can be inflated with air (meaning any type of suitable gas) or deflated to different pressures according to the nature of the ground, on a dismountable type wheel rim consisting, on the one hand, of a rim with a fixed flange, a removable flange and a split ring for holding the removable flange in position against a bead of the tire or, on the other hand, of a two-piece rim secured together.

2. Description of the Prior Art

This mounting relies upon a band or ring for holding and locking the beads of the tire against the flanges of the wheel rim, whatever the tire inflation pressure. Such bands or collars positioned on the rim are known and have the object of limiting collapse in the case of a flat or puncture. Such bands have a thickness greater than the height of the flange of the rim to precisely avoid a complete collapse of the tire on puncture. For example, according to a construction described in French Pat. No. 1,304,992, the locking band is mounted on the rim in the form of a ring applied to the inner surfaces of the beads under prior tension so as to compress the beads against the flanges of the rim. In this tire, the inner tube is not tubular but instead is constituted by a split casing surrounding the locking band, the edges of the split casing being held by gripping between the band and the bottom of the rim.

U.S. Pat. No. 2,339,542 also describes a pressure ring for a tire associated with an inner tube and designed to hold a tire on a rim. However, this ring which is of rubber is compressible and deformable. Since its radial expansion is prevented by metal wires which are incorporated therein, when the tire is inflated and in position on the rim with the wheel disk mounted so as to be clamped on the wheel hub in abutment against the rim, the ring is buttressed or arched so as to have a convex shape. This arching or buckling cancels one of the essential functions of the locking band, which is to prevent rotation of the tire on the rim in use over any surface with an inflation pressure less than normal. The same case applies with the sealing ring or annulus which is the subject of U.S. Pat. No. 2,857,951, which automatically retains an arched shape when the tire is deflated, and which is extendable under the effect of inflating air pressure to increase its radial width until it becomes flat.

In another known device (cf. Applicant's French Pat. No. 2,246,405), which device is intended for tubeless tires, the locking band or collar thereof is also mounted to the rim with pre-tensioning, but its width is greater than the inner separation of the beads of the tire when they are mounted to the flange of the rim.

Applicant has observed after several years of testing that these types of locking sleeves have a major drawback in that they are very expensive insofar as they are accompanied by an imperative need to place them under tension to position them on the wheel rim.

SUMMARY OF THE INVENTION

It is consequently an object of the present invention to provide a locking device which responds to the necessities of practice better than prior art devices aimed at the same objective, particularly such that it no longer needs to be applied to the rim with pre-tensioning, and whose function is such that the beads of the tire are held in all circumstances in contact with the flanges of the rim.

It is another object of the present invention not only to prevent breaking of the bead of the tire following a puncture, but also to both, on the one hand, prevent rotation of the tire on the rim in use over any surface (and this even with a very low inflation pressure on the order of 0.7 to 1 bar) and, on the other hand, prevent infiltration into the tire of water or various particles which cause premature wear of the tire, of the rim and possibly the inner tube of the tire includes the same. Applicant has in fact observed that such infiltration is inevitable if the tire is mounted only with the inner tube on the rim, but does not occur if a known device of the prior art is inserted between the rim and the tire.

It is another object of the invention to produce a locking device which responds better to the requirements of practice than previously known devices for the same purpose, particularly resulting in a reduced weight and a lower cost price relative to the prior art devices.

It is a further object of the invention to provide a locking device which can be also quite easily dismounted manually, when a two-piece rim is utilized, whereas the prior art devices require, at least for the dismounting thereof, special machines for unlocking.

According to the present invention there is provided a device for mounting a tire on a dismountable type wheel consisting, on the one hand, of a rim with a fixed flange, a removable flange and a split ring for holding the removable flange in position against a bead of the tire or, on the other hand, consisting of a two-piece rim secured together.

The device may be constituted by a sleeve of elastomer encircling the rim, which sleeve holds the first and second beads of the tire against the fixed and removable flanges of the rim, respectively, characterized in that the sleeve has an internal diameter substantially equal to the external diameter of the bottom of the rim so as to facilitate easy mounting of the sleeve on the rim, and wherein the transverse width of the sleeve is slightly greater than the internal spacing of the beads when they are in mounting contact with the flanges of the rim, said sleeve is provided with a traversing channel to enable passage of an inflating valve and the upper portion of the sleeve comprises a reinforcement member contained in a layer making the sleeve inextensible, that is to say preserving a constant external diameter.

According to a particular modality of this embodiment, the reinforcement is constituted by a layer of natural or synthetic textile cord or fabric or of metal cord, of the belt type. This inextensible reinforcing layer causes by lateral compression, a reduction in the internal diameter of the sleeve and, consequently, locking engagement on the rim.

According to another advantageous embodiment of the device according to the present invention, the sleeve has a cross-sectional shape adapted to the shape of the beads.

According to a preferred feature of this embodiment, the sleeve has a trapezoidal cross-section, the smallest base being applied to the rim in locking operation and the average of the two bases being greater than the separation of the beads.

In accordance with the invention, the radial thickness of the sleeve is approximately equal to the radial height of the flanges of the rim.

According to a particularly advantageous embodiment of the device according to the present invention, the average of the two bases of trapezoidal cross-section of the sleeve exceeds by approximately seven percent (7%) the distance of separation of the beads of the tire.

In yet another embodiment of the invention, the elastomer constituting the sleeve has a Shore hardness of approximately 70.

According to a further modification of the invention, applicable to the mounting of the tubeless tire, said cross channel enabling the passage of an air conduit of an inflating valve opens into a central groove formed in the small base of the sleeve for housing a hub for fastening said valve on the rim. On the other hand, for tube type tires there is no need for a cross channel or a central groove and instead a central hole for housing the air conduit of the valve is utilized.

In addition to the foregoing features, the invention also comprises other features which will be derived from the description which follows.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
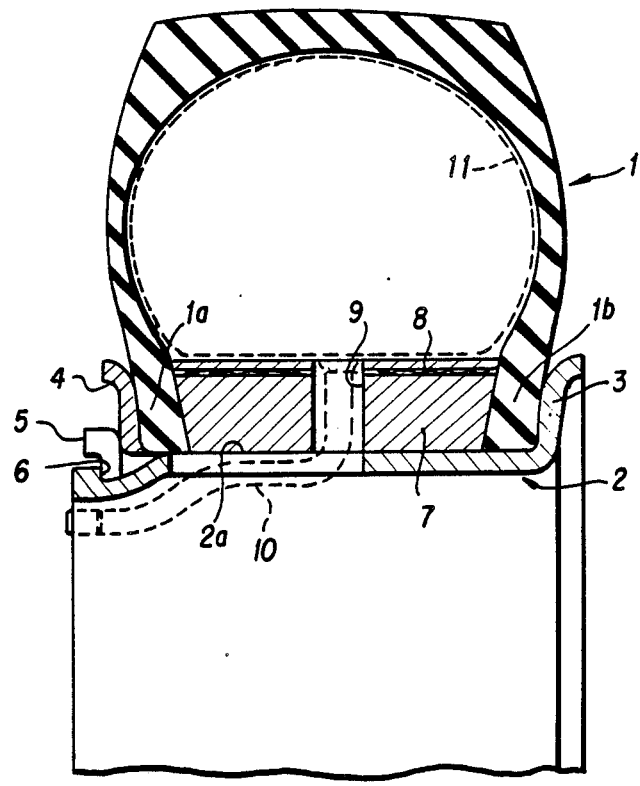
FIG. 1 is a sectional vivew of a tire on a rim mounted with the device according to the invention.
Figure 2:
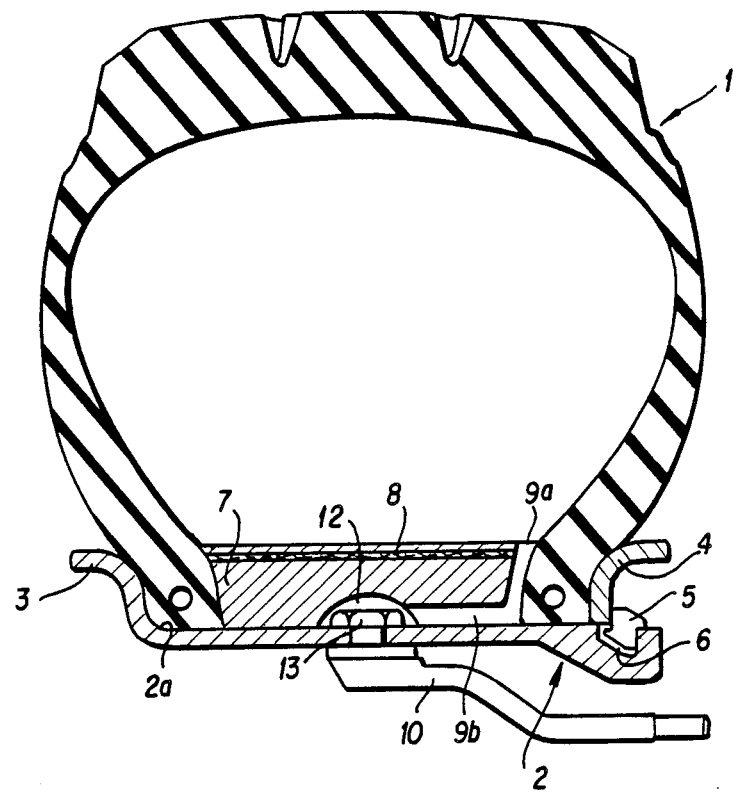
FIG. 2 is a sectional view of a modification of the embodiment of FIG. 1, for the mounting of a tubeless tire.

As shown in the drawings of FIG. 1, a tire 1 having an inner tube 11 is mounted on a rim 2 which comprises a fixed flange 3 and a removable flange 4 held in place against a first bead 1a of the tire by a split ring 5 inserted in the groove 6 formed on the edge of the flat bottom 2a of the rim 2. Encircling the flat bottom 2a of the rim is a homogeneous substantial voidless band or sleeve 7 of elastomer and of a Shore hardness of approximately 70, and whose inner diameter is substantially the same as the outer diameter of the bottom 2a of the rim 2. Flange 3 extends radially outwardly from flat bottom 2a. Sleeve 7 has, as shown in FIGS. 1 and 2, a cross-sectional shape of a substantially constant radial thickness, said radial thickness being of substantially the same radial height as said flanges 3, 4.

This sleeve 7 which is very easily fitted into the bottom 2a of the rim, comprises on its upper portion a substantially axially continuous reinforcement member 8 (for example of a corded natural or synthetic textile or fabric layer or metal wire layer, of the belt type) which renders the sleeve inextensible and which permits it to preserve a constant external diameter. The sleeve 7, which is placed between the two beads 1a and 1b has a cross-section with first and second laterally opposed surfaces adapted to the shape of the beads, respectively.

In the embodiment shown, the sleeve 7 has a trapezoidal cross-sectional shape or profile whose inner, small base is applied to or contacts the bottom 2a of the rim, while the large outer surface thereof has a transverse width greater than the separation between the first and and second beads 1a, 1b of the tire when the latter are applied against the flanges 3 and 4. The mean of the transverse width of two bases of the sleeve is of a length approximately seven percent (7%) greater than said separation, and the radial thickness of the sleeve 7 is approximately equal to the height of the flange 3 of the rim.

Thus, during positioning of the flange 4, the material of the sleeve 7 is compressed by lateral clamping of the beads 1a, 1b of the tire 1, and since the external diameter of the sleeve is invariable and constant due to the inextensibility characteristic which is conferred upon it by the inextensible continuous reinforcement member 8 incorporated in the vicinity of its upper surface and the fact that the elastomer is deformable but incompressible, it is the internal diameter of the sleeve 7 which has a tendency to diminish and which causes very firm adhesion or engagement of the sleeve 7 against the flat bottom 2a of the rim 2, thus preventing the tire 1 from slipping around the rim 2 whatever the pressure of inflation of the tire may be.

The sleeve 7 in addition has a cross channel 9 formed therein for passage thereinto of an air conduit or air passage means of the valve 10 of the inner tube 11. In the drawing of FIG. 1, the cross channel 9 is a simple radial hole. The elastomer forming the sleeve 7 must be sufficiently flexible to permit proper gripping of the beads 1a, 1b of the tire 1 and proper application of the rim 2 to prevent slipping. A Shore hardness of approximately 70 seems very acceptable.

The sleeve 7 according to the present invention prevents rotation of the tire 1 on its rim 2 when the bead of the tire is in locking engagement with the wheel rim and also prevents the penetration of water and various particles into the tire, thus enabling use over any terrain of a very low inflation pressure (approximately 0.7 to 1 bar) and facilitating an increase of the surface area of support of the tire 1 on the surface with which it contacts.

In the alternate embodiment of FIG. 2, there is shown a modification of the device of FIG. 1, applicable to the mounting of a tubeless tire. As regards the elements of FIG. 2 which are identical with those of FIG. 1, such are denoted by the same reference numerals.

The sleeve 7 includes a central groove 12 formed in a small base portion thereof for housing of the fastening boss 13 of the valve 10 on the rim 2.

To permit passage of the inflating fluid, the central groove 12 is connected to the inner space of the tire 1 by a cross channel formed in sleeve 7 comprising a substantially radial section 9a and a substantially axis section 9b, said radial section 9a being formed in or formed in the vicinity of one of the lateral surfaces of the sleeve 7. The cross channel can also be in the form of a simple radial bore situated in line with the central groove 12.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for mounting a tire on a dismountable rim having a bottom portion, at the level of which is defined an outer diameter of the rim, and first and second opposed flanges in contact with first and second beads of the tire, respectively, the device comprising:

deformable, substantially voidless, circumferentially continuous and incompressible sleeve means having a radially outer surface and a radilly inner surface, at the level of which are defined an outer and an inner diameter of the sleeve means, and encircling the rim in a mounted state for being deformed between said first and second beads and for holding said first and second beads of said tire against said first and second flanges, said sleeve means having an opening formed therein for permitting passage of air therethrough, and circumferentially continuous reinforcement means positioned in said sleeve means for causing locking engagement of said sleeve means on said bottom portion of said rim, thus securing said first and second beads of said tire between said sleeve means and said first and second flanges, respectively, wherein:

(i) said reinforcement means is substantially axially continuous between lateral sides of said sleeve means and arranged at an upper portion of said sleeve means in the vicinity of said radially outer surface of said sleeve means, the radial thickness of said sleeve means being substantially constant and the same as said first and second flanges, such that the outer diameter of said sleeve means is substantially constant over the whole of said outer surface, and wherein (ii) said inner diameter of said sleeve means is, in a free state, over the whole of said radially inner surface, substantially equal to the outer diameter of said rim, such that said sleeve means is mountable on the rim, in a free state, and is in locking engagement on the bottom portion of the rim, when in a mounted state.

2. A device according to claim 1, wherein said reinforcement layer further comprises a belt-type layer of corded fabric.

3. A device according to claim 1, wherein said sleeve means further comprises a sleeve having a cross-sectional shape with first and second laterally opposed surfaces adapted to the shape of said first and second beads of said tire, respectively.

4. A device according to claim 3, wherein said sleeve means further comprises a sleeve having a trapezium-shaped cross-section, so as to have a large outer surface and a small inner base, said small inner base being mounted so as to encircle said rim and wherein the mean of the lateral width dimensions of said outer surface and said inner base is approximately 7% greater than a distance of separation of said first and second beads.

5. A device according to claim 1, wherein said sleeve means has a Shore hardness of approximately 70.

6. A device according to claim 1, wherein said opening further comprises a radial bore formed in said sleeve means.

7. A device according to claim 1, further comprising air passage means and a fastening boss attached to said rim for connecting said air passage means to said rim wherein said sleeve means has a small inner base and a central groove formed in said small inner base for housing said fastening boss, said groove communicating with an inner space portion of said tire via said opening formed in said sleeve means.

8. A device according to claim 7, wherein said air passage means includes a radial section at least in the vicinity of first and second opposite lateral surfaces of said sleeve means.

9. A device according to claim 7, wherein said air passage means formed in said sleeve means has a radial section formed therein at least in the vicinity of one of said first and second opposite lateral surfaces of said sleeve means.

10. A device according to claim 1, wherein said reinforcement layer further comprises a belt-type layer of textile fabric.

11. A device according to claim 1, wherein said sleeve means further comprises a sleeve of homogeneous composition.

12. A device according to claim 1, wherein said sleeve means further comprises a sleeve of homogeneous composition.

13. A device according to claim 1, wherein the width dimension of said sleeve means is greater than an internal spacing of said first and second beads of said tire.

14. A device according to claim 1, wherein said reinforcement layer further comprises a belt-type layer of textile fabric.

15. A device according to claim 1, wherein said reinforcement layer further comprises a belt-type layer of metal cord.

16. A device according to claim 1, further comprising air passage means adapted to communicate said air through said sleeve means and means connected to said air passage means for selectively adjusting pressure in said tire.

* * * * *